No. 704,873. Patented July 15, 1902.
G. H. FOX.
MEANS FOR CLOSING JARS.
(Application filed Nov. 15, 1901.)
(No Model.)
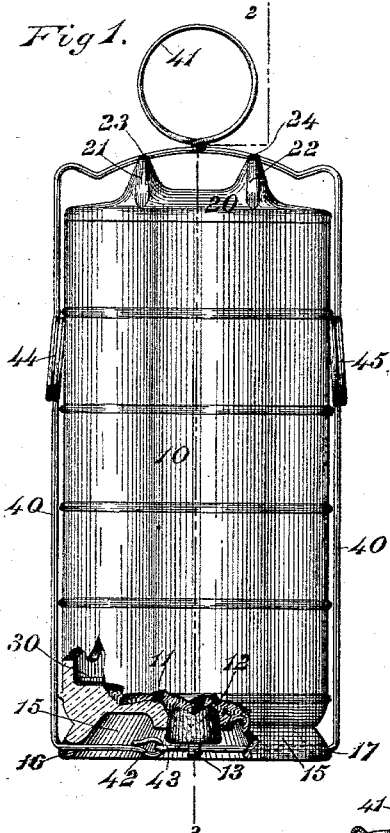
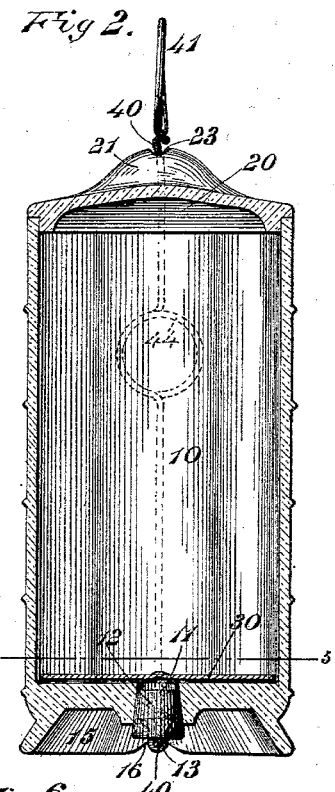
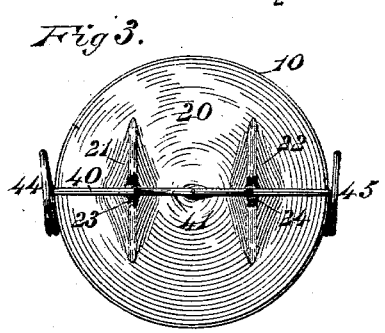
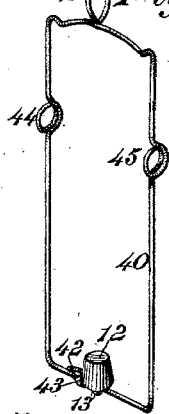
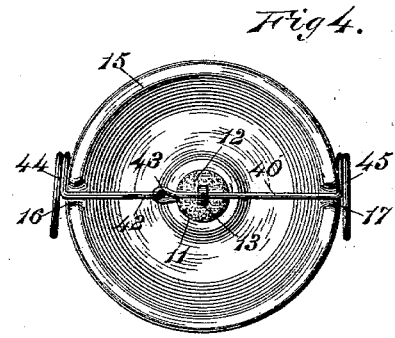
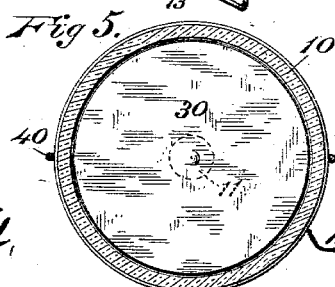
WITNESSES
Harry King
S. M. McColl
INVENTOR
Geo. H. Fox,
By F. C. Somes,
Attorney
THE NORRIS PETERS CO., PHOTO-LITHO., WASHINGTON, D. C.

UNITED STATES PATENT OFFICE.

GEORGE H. FOX, OF BANGOR, MAINE.

MEANS FOR CLOSING JARS.

SPECIFICATION forming part of Letters Patent No. 704,873, dated July 15, 1902.

Application filed November 16, 1901. Serial No. 82,541. (No model.)

*To all whom it may concern:*

Be it known that I, GEORGE H. FOX, a citizen of the United States of America, residing at Bangor, in the county of Penobscot, in the State of Maine, have invented certain new and useful Improvements in Means for Closing Jars, of which the following is a specification.

This invention relates to means for closing ice-cream and other jars, and it is especially adapted to an ice-cream jar provided with an internal discharging disk or plunger and having an opening in its bottom for the introduction of a plunger-rod to operate the plunger, as shown in my Patent No. 619,554.

The invention comprises a bail which will serve as means for carrying the jar and also as a locking device for both the top and bottom closures thereof.

Figure 1 of the accompanying drawings represents a side elevation of a jar having top and bottom openings provided with my improved closing means, a portion of the jar being broken out to show the bottom closure. Fig. 2 represents a vertical section thereof on line 2 2 of Fig. 1. Fig. 3 represents a plan view of the cover for the top of the jar, showing the means for holding it in closed position. Fig. 4 represents a plan view of the bottom of the jar, showing the bottom closure and the means for holding it firmly in position. Fig. 5 represents a horizontal section on line 5 5 of Fig. 2. Fig. 6 represents a perspective view of the device for holding the closures in position.

The same reference-numbers indicate corresponding parts in all the figures.

The jar 10, which is preferably composed of glass, may be round, square, corrugated, heart-shaped, diamond-shaped, or tray-shaped in cross-section, or any other suitable form adapted for packing ice-cream or other material which is to be forced out by means of pressure from one end. The jar is provided with openings at both ends, preferably a larger opening at the top for filling and discharge and a smaller opening at the bottom for the insertion of a plunger-rod to effect the discharge. The upper end or top is adapted to be closed by a suitable cover 20, and the bottom opening 11 is closed by a plug or stopper 12, preferably made of rubber, which is inserted from the outside. The cover 20 is provided on its exterior with vertical lugs or ears 21 and 22, preferably made integral therewith. These lugs are provided with notches 23 and 24, which are adapted to receive a locking-bail, hereinafter to be described.

The bottom of the jar is preferably provided with a vertical circumferential flange 15, which serves as a support therefor. This flange 15 is provided at diametrically opposite points with notches 16 and 17 for receiving the bail above referred to.

A disk 30, constituting a false bottom, is disposed in the jar 10 and serves as a plunger for removing the contents of the jar by means of a rod inserted through the aperture 11.

A bail 40, preferably composed of wire and made in one piece, is adapted to extend longitudinally around the jar 10 and to rest in the notches 23 and 24 and 16 and 17. This bail 40 is preferably constructed to form a complete circuit and is preferably provided at one end over the top of the jar 10 with a loop 41, adapted to serve as a handle, and at its opposite end with a stopper 12, which is independent of the circuit formed by the bail and serves as a closure for the opening in the bottom of the jar. The ends of the bail are provided with loops or eyes 42 and 43, which are to be hooked together, preferably at the bottom of the jar, to form a continuous bail. The bail 40 is also provided at its opposite sides between the handle 41 and the loops 42 and 43 with springs 44 and 45. These springs give elasticity to the bail and enable it to be drawn easily over the cover 20 and to be removed therefrom when desired, and they also hold it securely in adjusted position.

The stopper 12 is preferably provided with an eye 13, through which the bail 40 passes. By attaching the stopper to the bail it is held firmly in the aperture 11 against accidental displacement when the jar is closed, and when it is desired to remove the stopper the attached bail may be used as a pulling device to withdraw it. This attachment also avoids the liability of the stopper being mislaid or lost. The notched projection or flange 15 extends beyond the plane of the stopper 12 and serves to elevate the bottom of the jar above the lower end of said stopper and the locking device to which it is connected and to hold the locking device in position on the jar.

In the use of this jar the disk 30 is placed in the bottom thereof, the stopper 12 inserted in the aperture 11, and the jar filled with ice-cream or other desired material. The top 20 is then placed on the jar and the bail 40 drawn up over the top and disposed in the notches 23 and 24 and 16 and 17. The jar is thus tightly closed and ready for delivery to a customer. When it is desired to remove the contents from the jar, the bail is removed, the stopper 12 withdrawn, and the top 20 taken off. Any suitable rod is then inserted through the aperture 11 against the disk 30 and the contents of the jar pushed out through the top or mouth thereof.

I claim as my invention—

1. The combination of a jar provided with openings at both ends, closures for said openings, and a locking device attached to and serving as a carrier for one of said closures and adapted to engage the other closure; said jar having a vertical notched flange which extends beyond the plane of the attached closure and serves to protect the latter and to hold the locking device in position on the jar.

2. The combination of a jar provided with openings at both ends, closures for said openings, and a locking device attached to and serving as a carrier for the bottom closure and adapted to engage the top closure; said jar having a vertical notched flange which extends beyond the plane of the attached closure and serves to protect the latter and to hold the locking device in position on the jar.

3. The combination of a jar provided with openings at both ends, closures for said openings, and an elastic locking device attached to and serving as a carrier for one of said closures and adapted to engage the other closure; said jar having a vertical notched flange which extends beyond the plane of the attached closure and serves to protect the latter and to hold the locking device in position on the jar.

4. The combination of a jar provided with openings at both ends and with a flange at one end having notches, closures for said openings, and a continuous bail engaging said notches and extending around said jar and over both closures, the lower closure being attached to said bail and carried thereby.

5. The combination of a jar provided with a top opening and with a bottom having a small opening, said jar being provided at its bottom with a downwardly-extending notched flange, a notched cover for said top opening, a stopper for the small bottom opening, the outer end of said stopper being above the plane of said flange, and a continuous bail for securing said cover and stopper extending around said jar and engaging said stopper and the notches of said flange and cover.

6. The combination of a jar provided with openings at both ends and having a downwardly-extending peripheral flange at the bottom thereof, said flange having oppositely-disposed notches therein, closures for said openings, and a bail attached to the bottom closure and adapted to extend over the top closure, said bail fitting in said notches.

7. A bail forming a complete circuit and adapted to extend around a jar, said bail having a handle at one end, a stopper independent of the circuit attached to the other end and spring-loops formed in said bail between said stopper and handle, whereby the bail is clamped around the jar.

8. A bail forming a complete circuit in one continuous piece and adapted to surround a jar, said bail having a loop in one end thereof adapted to serve as a handle, and having its terminal ends fastened together and provided with a stopper independent of the circuit.

9. A bail forming a complete circuit adapted to surround a jar, said bail having a loop-handle formed in one end, a stopper attached to the other end independent of said circuit and springs formed in said bail at opposite sides between said handle and stopper.

GEORGE H. FOX.

Witnesses:
GEO. W. E. BARROWS,
WALTER A. DANFORTH.